(12) United States Patent
Roiser

(10) Patent No.: US 7,950,632 B2
(45) Date of Patent: May 31, 2011

(54) DAMPING DEVICE

(75) Inventor: Thomas Roiser, Mondsee (AT)

(73) Assignee: Komperdell Sportartikel Gesellschaft m.b.H., Mondsee (AT)

( * ) Notice: Subject to any disclaimer, the term of this patent is extended or adjusted under 35 U.S.C. 154(b) by 942 days.

(21) Appl. No.: 10/573,493

(22) PCT Filed: Oct. 25, 2004

(86) PCT No.: PCT/AT2004/000369
§ 371 (c)(1),
(2), (4) Date: Jul. 12, 2007

(87) PCT Pub. No.: WO2005/057044
PCT Pub. Date: Jun. 23, 2005

(65) Prior Publication Data
US 2007/0252375 A1 Nov. 1, 2007

(30) Foreign Application Priority Data

Dec. 15, 2003 (AT) ................................ GM892/2003

(51) Int. Cl.
*F16F 9/36* (2006.01)
(52) U.S. Cl. ............ 267/129; 267/71; 267/124; 135/83; 280/823
(58) Field of Classification Search ............ 267/34, 267/202, 201, 71, 124, 129; 135/82, 83; 280/821, 823
See application file for complete search history.

(56) References Cited

U.S. PATENT DOCUMENTS

| | | | |
|---|---|---|---|
| 2,705,634 A | 4/1955 | Sampson et al. | |
| 3,831,919 A | 8/1974 | Nicholls | |
| 3,856,285 A * | 12/1974 | Yamada | 267/202 |
| 4,244,602 A | 1/1981 | Allsop et al. | |
| 4,768,629 A | 9/1988 | Woessner | |
| 6,055,998 A * | 5/2000 | Bader | 135/69 |
| 6,443,271 B2 * | 9/2002 | Schmidt | 188/285 |
| 7,025,072 B2 * | 4/2006 | McGrath | 135/75 |
| 7,229,101 B2 | 6/2007 | Lenhart | |

(Continued)

FOREIGN PATENT DOCUMENTS

DE 2130838 1/1972

(Continued)

OTHER PUBLICATIONS

AT Search Report dated Mar. 31 2004, from corresponding AT application 007045.

(Continued)

*Primary Examiner* — Bradley T King
(74) *Attorney, Agent, or Firm* — Young & Thompson

(57) ABSTRACT

A damping device, which is provided between a handle and pole tube of a sport pole such as a ski pole, combines the action of a helical compression spring (17) with that of a gas compression spring, whereby a rod-shaped body (5) can be displaced inside a tube (3). An elastic insert (13), which is subjected to the action of the helical compression spring (17), is provided at the end of the rod-shaped body (5). The rod-shaped body (5) is pressed into the tube (3), e.g. when the pole is placed against the ground, and the insert (13) deforms and tightly abuts against the tube (3) from the inside whereby forming a gas compression spring. The damping action is progressively increased inside the tube (3) by the friction of the deformable insert (13).

13 Claims, 3 Drawing Sheets

U.S. PATENT DOCUMENTS

2001/0052441 A1  12/2001  Schmidt
2002/0170587 A1* 11/2002  Uemura .................. 135/65

FOREIGN PATENT DOCUMENTS

| | | |
|---|---|---|
| DE | 20117146 | 1/1972 |
| DE | 2518425 | 11/1976 |
| DE | 2739101 | 10/1978 |
| EP | 1118363 | 7/2001 |
| FR | 1 072 006 | 9/1954 |
| FR | 2 100 053 | 3/1972 |
| FR | 2 387 064 | 11/1978 |
| WO | 02079021 | 10/2002 |

OTHER PUBLICATIONS

CN Office Action dated Nov. 9, 2007 from corresponding CN application 200480030832.2.

KR Office Action dated Jan. 5, 2011, in the corresp KR2006-7014336.

* cited by examiner

DAMPING DEVICE

The invention relates to a device for damping the relative motion between two bodies which can move relative to one another, especially between two parts of a pole, preferably between the handle and the rod of the pole.

FIELD OF THE INVENTION

These damping devices are used especially for poles with a handle, in which the handle can move relative to the pole in the axial direction against the force of a spring, in order to absorb the impact energy when the pole is put down, especially on hard ground, with low vibrations.

Known devices of this type between the pole and the handle have a steel helical compression spring which is guided on a steel rod and which extends in the lengthwise direction of the pole.

RELATED ART

Other proposals use the combination of a steel helical compression spring with elastomer bodies located on both sides of the spring, by which improved damping action is to be achieved.

SUMMARY OF THE INVENTION

The object of the invention is to devise a device of the initially mentioned type with improved damping action.

This object is achieved as claimed in the invention with a device which is characterized in that there are a gas compression spring and a helical compression spring between the bodies which can move relative to one another.

Preferred and advantageous embodiments of the damping device as claimed in the invention are the subject matter of the invention.

In the damping device as claimed in the invention, advantageously the action of a (metal) helical compression spring is combined with the action of a gas compression spring. This yields a damping action which is initially small and grows as the damping device is increasingly compressed, until finally the end of the stroke of the damping device is reached.

In one embodiment it is provided that a rod-shaped body is held with its lower end in a tube closed on one side, and that on its end in which the tube is held there is a seal between the rod-shaped body and tube, which seal is activated by pressure on the rod-shaped body in the direction of displacement into the tube. In this embodiment it is advantageous that the piston of the gas compression spring is equipped with an automatically activating ring seal which also acts as a valve such that the valve formed by the ring seal closes when the gas compression spring is compressed (when the stick is put down), and is open when the gas compression spring moves apart.

In one embodiment it is provided that on the open end of the tube there is an end stop damper. Here it is preferable that when the rod-shaped body has been pushed into the tube the ring-shaped end stop adjoins the end stop damper and clamps it between the open end of the tube and the end stop. This has the advantage that the damping device is caught and stopped gently at the end of its stroke, not suddenly.

Other details and features of the invention will become apparent from the following description of one preferred exemplary embodiment using the drawings.

The damping device as claimed in the invention consists of a rod-shaped body 5 which is held in the tube 3 and which on its top end bears a ring flange 7. At a distance from the top end of the rod-shaped body 5 there is a ring-shaped stop 9 for limiting the stroke of the rod-shaped body 5 relative to the tube 3.

DETAILED DESCRIPTION OF THE INVENTION

Figure 6:
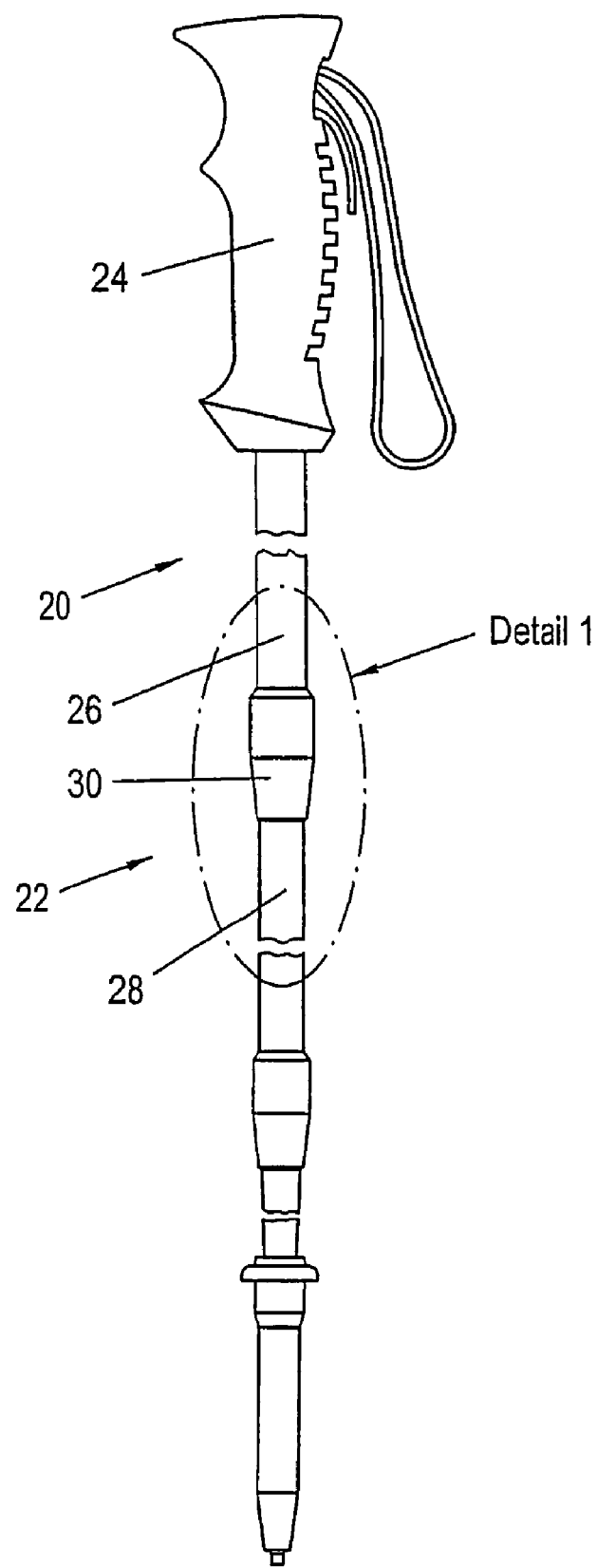
FIG. 6 shows a ski pole and FIG. 7 an example of installation of a damping device in the ski pole.

The rod-shaped body 5 with its area which is located underneath the end stop damper 11 in the form of a rubber spring is held in the tube 3 of a pole, for example a ski pole or walking stick (compare FIG. 6).

On its end held in the tube 3 the rod-shaped body 5 bears an elastically deformable seal 13 in the form of a disk which is covered on the free end of the rod-shaped body 5 by an intermediate disk 15 which can move axially relative to the rod 5. Underneath the intermediate disk 15 is a helical compression spring 17 which adjoins the intermediate disk 15 and which with its other end is supported on the closed end 19 of the tube 3 in which the rod 5 is held.

Figures 1, 2, 3, 4, 5:
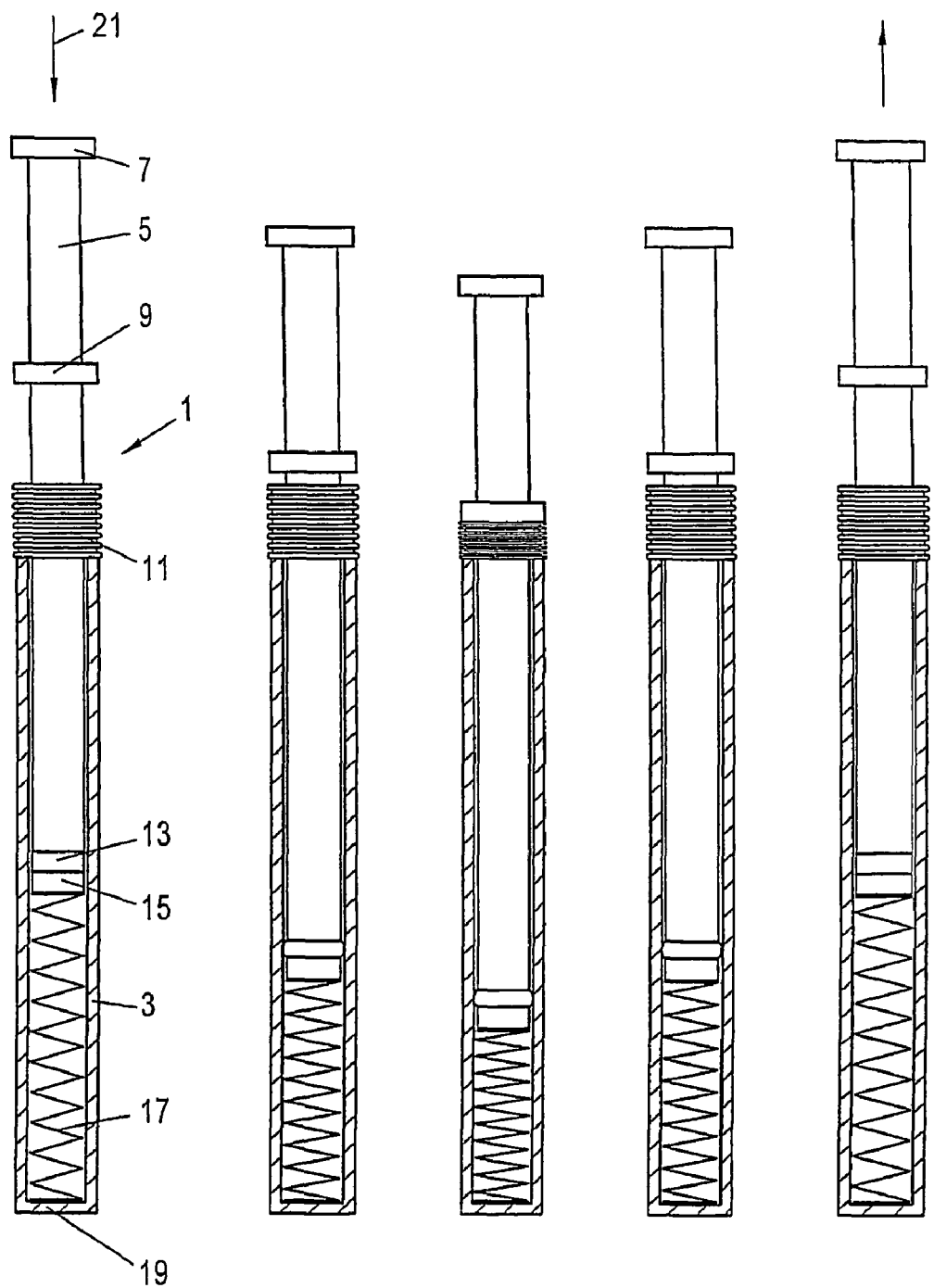
FIGS. 1 to 5 show different positions of the damping device as claimed in the invention.

If at this point in the direction of the arrow 21 shown in FIG. 1 pressure is applied to the rod-shaped body 5, it moves into the tube 3, the elastic insert 13 being deformed by the pressure applied by the spring 17 to the intermediate disk 15 such that its side surface which is first of all essentially in the shape of a cylindrical jacket arches to the outside in a bead shape and is placed against the inner surface of the tube 3 (ring seal). In this way gas (air) is enclosed in the tube 3 in the area of the helical spring 17 and acts as a gas compression spring which supports the spring force of the helical spring 17 (FIG. 2). As the movement of the rod-shaped body 5 down continues (FIG. 3) the pressure of the spring 17 on the intermediate disk 15 becomes greater and the elastic insert 13 is pressed with its peripheral surface more and more strongly against the inside surface of the tube 3 so that the friction between the outside of the insert 13 and the inner surface of the tube 3 is continuously increased and thus the damping action is increasingly intensified by increasing friction.

At the end of the motion of the rod-shaped body 5 down, its stop 9 rests on the end stop damper 11 which is for example an elastically deformable body which can be made in the manner of bellows.

When the pressure in the direction of the arrow 21 shown in FIG. 1 stops, the elastically deformable insert 13 again assumes its cylindrical shape and the helical compression spring 17 pushes the rod-shaped body 5 up out of the tube 3 and the damping device moves back into its initial position as shown in FIG. 5.

When the rod-shaped body 5 moves down, damping of the motion of the rod-shaped body 5 relative to the tube 3 is achieved by the described design of the damping device as claimed in the invention by:

a) Action of the gas compression spring (compression of the gas cushion in the lower part of the tube 3), b) Compression of the helical compression spring 17 between the rod-shaped body 5 and the bottom 19 of the tube 3 and c) Friction between the inner surface of the tube 3 and the periphery of the outside surface of the insert 13 of elastic material, which surface is deformed into the shape of a bead.

Figure 7:
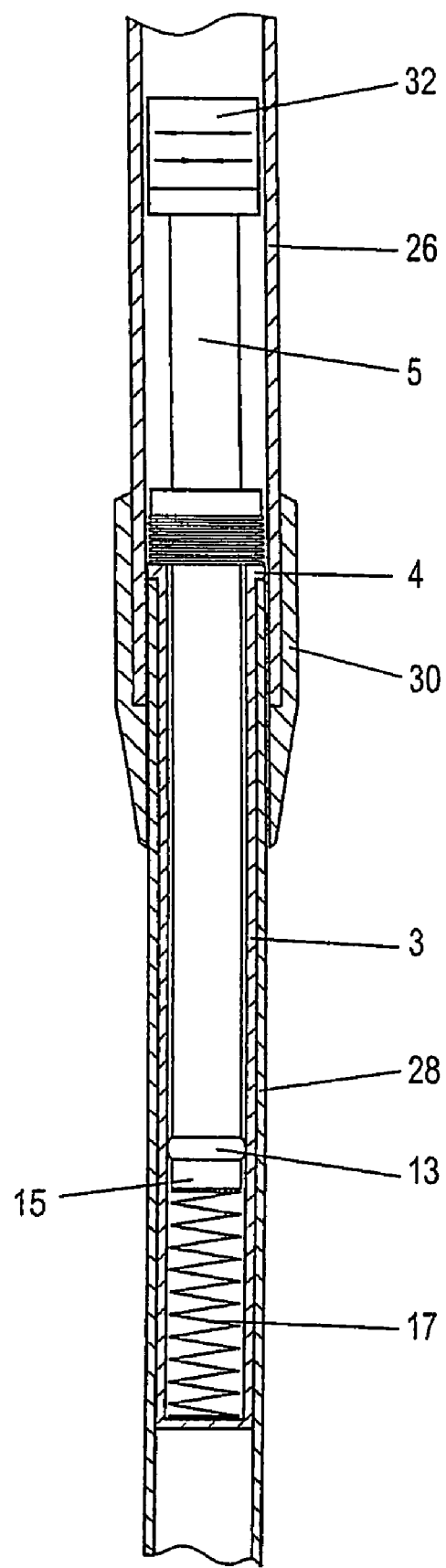

FIG. 6 shows a ski pole 20. FIG. 7 shows in an axial section how the damping device described using FIGS. 1 to 5 with respect to its structure and function can be installed in the pole 20 with the handle 24 according to the exemplary embodiment of the invention.

FIG. 6 schematically shows a ski pole 20 with a pole tube 22 which in the part connected to the handle 24 consists of two parts which can move relative to one another, specifically a telescoping upper part 26 and a telescoping middle part 28.

FIG. 7 shows one particular of the ski pole 20 from FIG. 6 partially in section, which particular is shown in FIG. 6 with detail 1.

FIG. 7 shows that the telescoping upper part 26 of the pole tube 22 is placed over the telescoping middle part 28 of the pole tube 22, the lower end of the telescoping upper part 26 being lined with a sleeve 30.

The telescoping upper part 26 of the ski tube 22 is coupled to the rod-shaped body 5 of the damping device as shown in FIGS. 1 to 5, so that for example when the pole 20 is put down on the ground, pressure applied via the handle 24 to the telescoping upper part 26 causes the rod-shaped body 5 to be pushed down, as shown in FIGS. 1 to 3.

The coupling 32 between the telescoping upper part 26 and the rod-shaped body 5 of the damping device can be made in the manner of a radially expandable clamp part as is known for athletic poles of variable length and which can be actuated by relative turning of the telescoping parts 26 and 28.

In the top end of the telescoping middle part 28 of the pole tube 22 the damping device as claimed in the invention is held with its tube 3, the tube 3 resting with the upper end flange 4 on the free end of the telescoping middle part 28.

In summary, one exemplary embodiment of the invention can be explained as follows;

A damping device located between the handle 24 and the pole tube 22 of an athletic pole 20, such as a ski pole, combines the action of a helical compression spring 17 with that of a gas compression spring, in the tube 3 a rod-shaped body 5 being movable. On the end of the rod-shaped body 5 there is an elastic insert 13 which is loaded by the helical compression spring 17. If the rod-shaped body 5 is pressed into the tube 3, for example when the pole 20 is put down on the ground, the insert 13 deforms and seals from the inside against the tube 3, forming a gas compression spring. The damping action is increasingly intensified by the friction of the deformable insert 13 in the tube 3.

The invention claimed is:

1. A device for damping the relative motion between a handle (24) and a rod (22) of a pole (20), the device comprising:
    a tube (3) with a closed lower end (19), the lower end (19) fixed within the rod (22);
    a rod-shaped body (5) with a free lower end held in the tube (3);
    an elastically deformable seal (13) on the free lower end of the rod-shaped body (5), under a pressure the seal being deformed to bear against an inner surface of the tube (3);
    upon a displacement of the rod-shaped body (5) into the tube (3), a gas compression spring comprises a gas-filled space located within the tube (3) between the closed lower end (19) of the tube (3) and the seal (13) bearing against the inner surface of the tube (3); and
    a helical compression spring (17) clamped between i) the closed lower end (19) of the tube (3) and ii) the free lower end of the rod-shaped body (5),
    wherein under the displacement of the rod-shaped body (5) into the tube (3) the helical compression spring (17) creates the pressure on the seal (13) that deforms the seal (13) to bear against the inner surface of the tube (3).

2. The device as claimed in claim 1, further comprising an intermediate disk located at the free lower end of the tube (3) and supporting the helical compression spring (17).

3. The device as claimed in claim 1, wherein there is a ring-shaped end stop (9) located at a stroke position on the rod-shaped body (5) for limiting a stroke of the rod-shaped body (5) relative to the tube (3).

4. The device as claimed in claim 3, wherein there is an end stop damper (11) mounted on an open end of the tube (3).

5. The device as claimed in claim 4, wherein pushing the rod-shaped body (5) into the tube (3) moves the ring-shaped end stop (9) against the end stop damper (11) and clamps the end stop damper (11) between the open end of the tube (3) and the end stop (9).

6. The device as claimed in claim 1, wherein the tube (3) is part of the pole (22).

7. The device as claimed in claim 1, wherein the tube (3) is located within the pole tube (22) of an athletic pole 20.

8. The device as claimed in claim 7, wherein
    the tube (3) comprises an upper end flange (4) resting on a top surface of a telescoping part (28), and
    the rod-shaped body (5) is coupled to a handle side part (26) at a top end of the rod-shaped body (5) via a coupling (32).

9. The device as claimed in claim 8, wherein the coupling (32) between the rod-shaped body (5) and the part (26) of the pole tube (22) is releasable.

10. The device as claimed in claim 8, wherein the handle (24) is located on the handle side part (26) of the pole, the handle side part (26) and the telescoping part (26) telescoping into one another.

11. The device as claimed in claim 1, wherein the seal (13) is in form of a disk.

12. The device as claimed in claim 1, wherein the seal (13) functions as a valve which is closed when the gas compression spring is compressed under the displacement of the rod-shaped body (5) into the tube (3), wherein the helical compression spring (17) creates the pressure on the seal (13) that deforms the seal (13) to bear against the inner surface of the tube (3), and the valve is open when the gas compression spring moves apart.

13. A damping device for damping the shock received in a pole (20), the device comprising:
    a pole comprises a handle (24), a handle side part (26) and a telescoping part (28);
    a tube (3) with a closed lower end (19) and an upper end flange (4) resting on an top surface of the telescoping part (28);
    an end stop damper (11) mounted on a top surface of the tube (3);
    a rod-shaped body (5) coupled to the handle side part (26) via a coupling (32), which the body (5) comprises a lower free end slidably held within the tube (3) and comprises a ring-shaped stop (9) located at a stroke position limiting a stroke of the rod-shaped body (5);
    an elastically deformable seal (13) mounted on the free end of the rod-shaped body (5), which the seal is in form of a disk; and
    a helical compression spring (17) located between the seal (13) and the closed lower end of tube (19),
    wherein in a downward stroke of the body (5), a pressure from the spring (17) deforms the seal so that the seal (13) bears against the inner surface of the tube (3), thereby the seal (13) acting as a valve to close the tube (3) and to seal and compress a gas enclosed within the tube (3) between the deformed seal (13) and the close lower end (19) around the spring (17).

* * * * *